United States Patent
Hazlewood et al.

(10) Patent No.: US 8,073,875 B2
(45) Date of Patent: Dec. 6, 2011

(54) MANAGING DELETED DIRECTORY ENTRIES

(75) Inventors: Kristin Marie Hazlewood, Austin, TX (US); John Mark McConaughy, Austin, TX (US); Gary Dale Williams, Driftwood, TX (US); Shevaun-Ann Michelle Fontenot, Austin, TX (US); Daw Feng, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/428,115

(22) Filed: Apr. 22, 2009

(65) Prior Publication Data

US 2010/0274769 A1    Oct. 28, 2010

(51) Int. Cl.
*G06F 7/00* (2006.01)
*G06F 17/30* (2006.01)

(52) U.S. Cl. ........................................ 707/802
(58) Field of Classification Search ............ 707/802
See application file for complete search history.

(56) References Cited

U.S. PATENT DOCUMENTS

| | | | |
|---|---|---|---|
| 6,119,122 A | 9/2000 | Bunnell | |
| 6,496,944 B1 | 12/2002 | Hsiao et al. | |
| 6,654,891 B1 | 11/2003 | Borsato et al. | |
| 7,251,749 B1 * | 7/2007 | Fong et al. | 714/20 |
| 2001/0047347 A1 * | 11/2001 | Perell et al. | 707/1 |
| 2002/0032775 A1 | 3/2002 | Venkataramaiah et al. | |
| 2003/0088615 A1 | 5/2003 | Good et al. | |
| 2003/0163449 A1 * | 8/2003 | Iwano et al. | 707/1 |
| 2004/0268229 A1 * | 12/2004 | Paoli et al. | 715/508 |
| 2005/0027823 A1 * | 2/2005 | Rana | 709/219 |
| 2005/0278385 A1 | 12/2005 | Sutela et al. | |
| 2006/0015527 A1 | 1/2006 | Dingle | |
| 2006/0230121 A1 | 10/2006 | Arndt et al. | |
| 2006/0259587 A1 | 11/2006 | Ackerman et al. | |
| 2008/0033966 A1 | 2/2008 | Wahl | |
| 2008/0228693 A1 * | 9/2008 | Esser et al. | 707/1 |
| 2008/0247281 A1 * | 10/2008 | Maeda et al. | 369/44.27 |
| 2008/0256139 A1 | 10/2008 | Jessee | |
| 2009/0006860 A1 * | 1/2009 | Ross | 713/189 |

* cited by examiner

*Primary Examiner* — Kuen S Lu
(74) *Attorney, Agent, or Firm* — Garg Law Firm, PLLC; Rakesh Garg; Jeffrey S. LaBaw

(57) ABSTRACT

An instruction to delete the entry is received. A second entry that includes a reference to the entry is identified. A third entry including information to be preserved from the entry is added in a deleted entries subtree. The third entry is modified to include the reference information from the second entry. The third entry is saved such that during a restore of the entry the third entry provides the information to restore the entry and the reference to the entry. The third entry may include a set of attributes that store an identifier of the second entry. The entry is restored from the third entry and made available in the directory. A reference is recreated in the second entry to the restored entry forming a restored second entry.

20 Claims, 6 Drawing Sheets

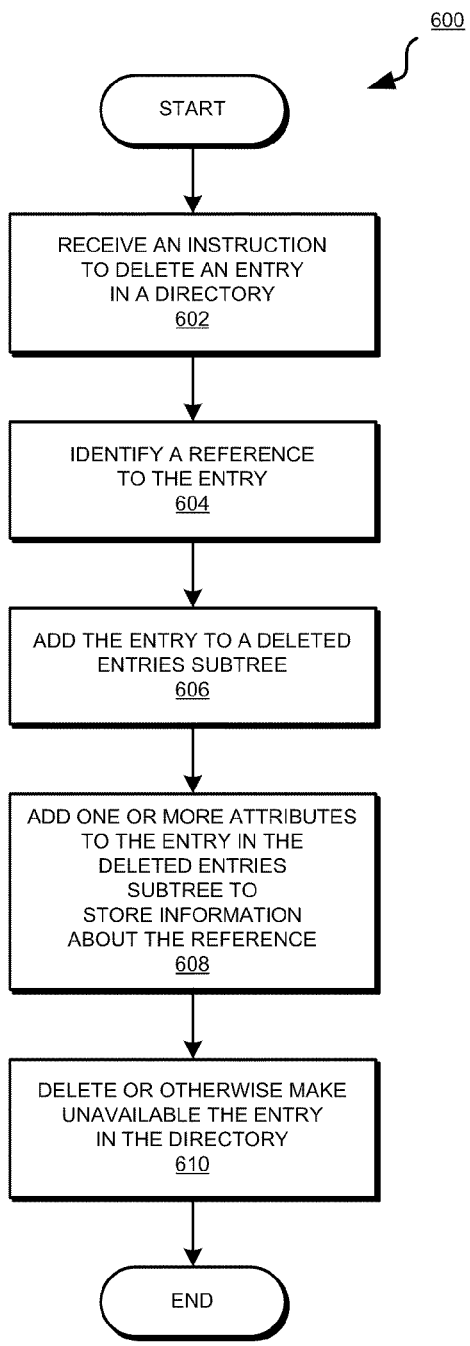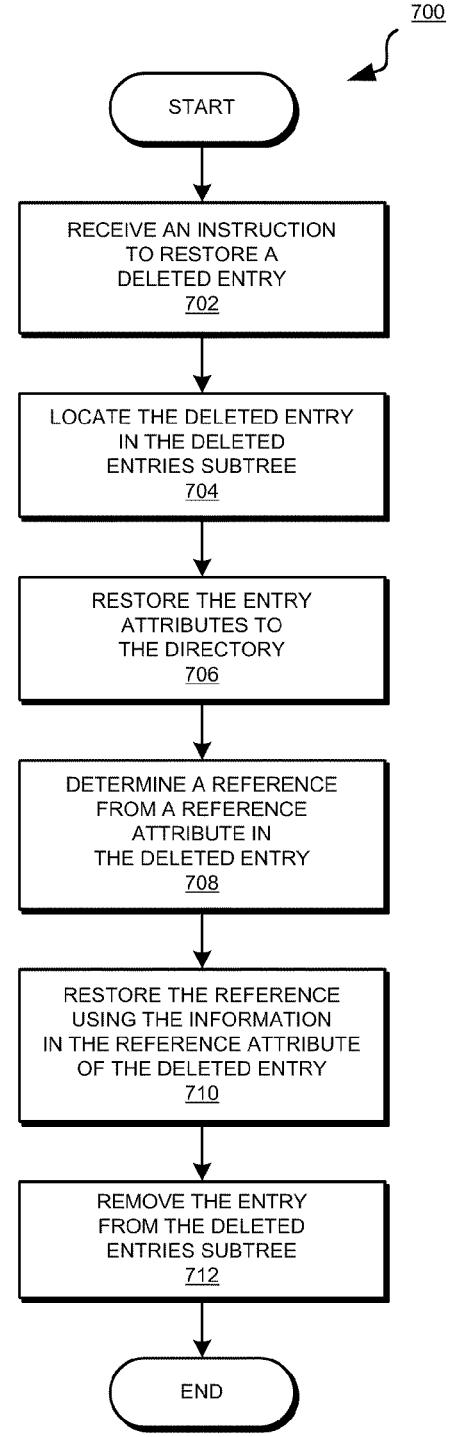

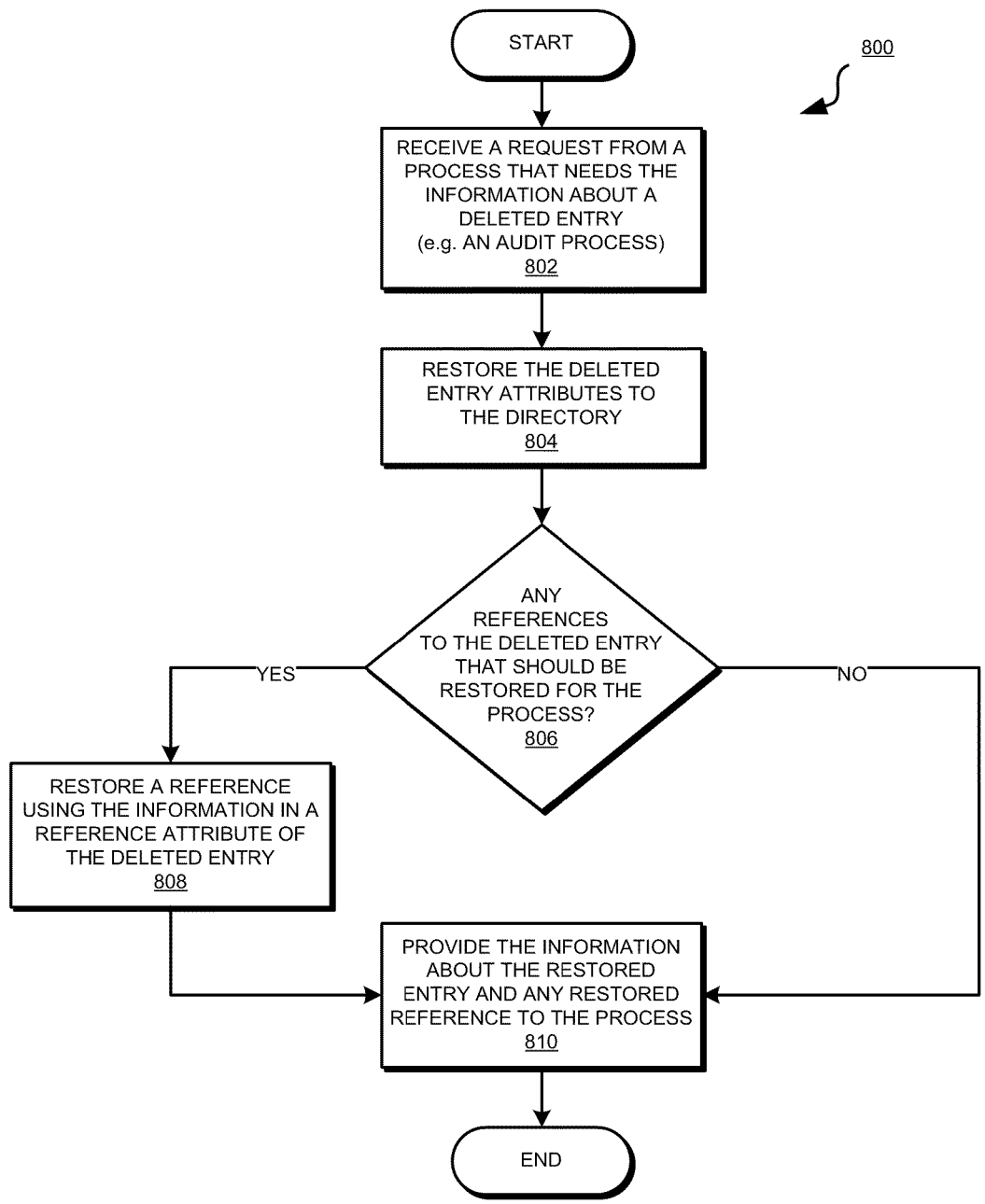

MANAGING DELETED DIRECTORY ENTRIES

RELATED APPLICATION

The present invention is related to similar subject matter of co-pending and commonly assigned U.S. patent application Ser. No. 12/428,094, entitled "PRESERVING REFERENCES TO DELETED DIRECTORY ENTRIES," filed on Apr. 22, 2009, which is hereby incorporated by reference.

BACKGROUND OF THE INVENTION

1. Field of the Invention

The present invention relates generally to an improved data processing system, and in particular, to a computer implemented method for managing directories. Still more particularly, the present invention relates to a computer implemented method, system, and computer usable program code for managing deleted directory entries.

2. Description of the Related Art

A directory is a hierarchical arrangement of information pertaining to objects, such as users, groups, and systems in an organization. A directory server is a server in a data processing environment that provides a directory service. A directory service is a process by which a user in the data processing environment can retrieve details of an object from a directory server by providing a name of the object.

Directory servers may serve directories that are arranged according to some standard. Standards, such as Lightweight Directory Access Protocol (LDAP), specify ways of accessing the information stored in a directory, the operations allowed on the information in the directory, and how those operations are to be executed with respect to the directory. A directory may be implemented using a standard, a variation of the standard, or by using a proprietary hierarchy. For example, the illustrative embodiments may be implemented using an X.500 directory server, which implements a directory standard of that name. The illustrative embodiments may also be implemented using a name server, or a user location service server (ULS server).

Information pertaining to an object, such as a user or a system, in a directory is called an entry. Typically, an entry includes a set of attributes and may have a name. An attribute of an entry is a data component of the entry. An attribute may itself have a value, or an attribute may be a data structure that may include one or more tags, each tag having a value. A tag is a data component of an attribute. Entries in a directory may be modified from time to time. Furthermore, entries in a directory may relate to and reference other entries. Certain data stored in a directory may include references to a set of entries in the directory. A set of entries is one or more entries. Frequently, such as during directory maintenance, an entry may have to be modified or deleted.

SUMMARY OF THE INVENTION

The illustrative embodiments provide a method, system, and computer usable program product for managing deleted directory entries. An instruction to delete the entry is received. A second entry that includes a reference to the entry is identified, the reference to the entry being a reference information. A third entry is added in a deleted entries subtree, the third entry including information to be preserved from the entry. The third entry is modified to include the reference information from the second entry. The third entry is saved such that during a restore of the entry the third entry provides the information preserved from the entry to restore the entry and the reference information in the second entry to restore the reference to the entry.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 6 depicts a flowchart of a process of preserving references to a deleted directory entry in accordance with an illustrative embodiment;

FIG. 7 depicts a flowchart of a process of restoring a previously deleted entry that has been preserved according to an illustrative embodiment; and FIG. 8 depicts a flowchart of a process of supporting an application or business process by managing deleted entries in accordance with an illustrative embodiment.

DETAILED DESCRIPTION OF THE PREFERRED EMBODIMENT

Figure 1:
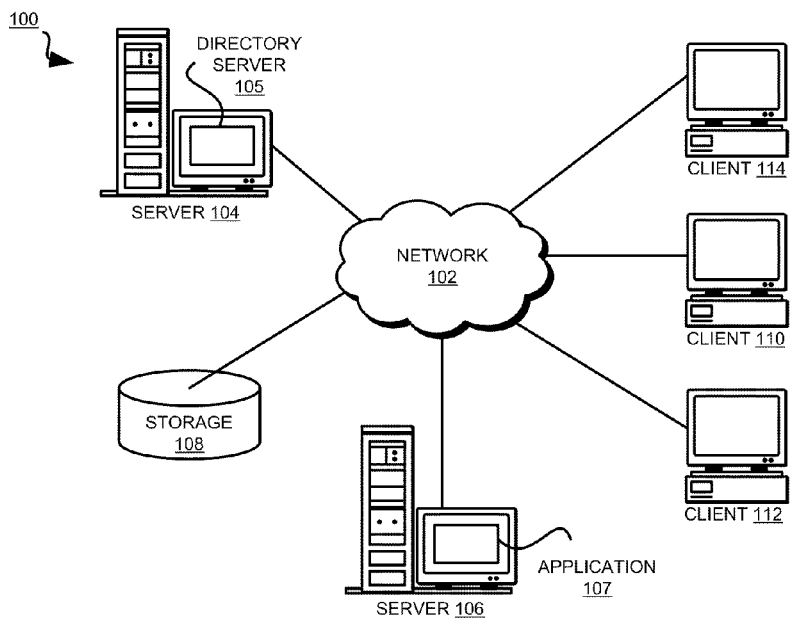
FIG. 1 depicts a pictorial representation of a network of data processing systems in which illustrative embodiments may be implemented.

Presently available directory servers manage deleted entries through a change log, a tombstone directory, or both. A change log is a log file of changes that are made to the directory served by the directory server. A tombstone directory is a directory subtree separate from the main directory of the directory server, and contains those entries that are deleted from the main directory.

The invention recognizes that a change log stores just the delete request but not the details of the deleted entry. For example, a log in the change log may contain the date and time of a delete operation, an identifier of the entry being deleted, and an identifier of a user or system requesting or performing the delete operation. An identifier of an entry is a name, keyword, code, or some alphanumeric text that can be used to locate an entry in a directory.

The invention further recognizes that a tombstone directory stores the attributes associated with the deleted entry but not any references to the entry that were deleted or disrupted when the entry was deleted. An entry in a directory can be configured to have a set of attributes. A set of attributes is one or more attributes. Furthermore, different entries in a given directory may include different sets of attributes.

A reference to a first entry is information associated with a second entry that relates the second entry to the first entry. In other words, the second entry is said to reference the first entry by using that information. For example, a directory may maintain an access control list (ACL). An access control list is a list of entries and their corresponding access privileges to certain resources in a data processing environment.

As an example, an implementation of an access control list in a directory may reference an entry stored elsewhere in the directory, such as the directory subtree where the object entries may be stored, and store the access privileges of the entry being referenced. Thus, the example access control list in such an implementation may include a list of references to entries correlated with a list of access privileges.

Some other examples of data in a directory that may use references to entries in the directory include group memberships, seeAlso lists, and aliases. Group membership information in a directory may correlate a reference to an entry in the directory to a list of groups to which the user or system identified in the entry may belong.

SeeAlso lists may include information that when accessed by an application or system may point to other entries in the directory that may also be relevant to the application or system. Generally, the seeAlso list may point to such entries by a reference to those entries.

An alias list in a directory may correlate an alias to an entry in the directory that may be used or found using that alias. The alias list may correlate the alias to the entry by a reference to the entry.

The invention recognizes that access control lists, group memberships, seeAlso lists, and aliases are only some examples of information in a directory that use references to entries in the directory. The invention recognizes that many other data structures, data hierarchies, data organizations, or pieces of information in a directory may relate to entries in the directory by reference and benefit from an embodiment of the invention.

The invention further recognizes that, presently, when an entry is deleted in a directory, the references to the entry are also deleted. In other words, if an entry associated with a user "Joe Q. Public" is deleted from the directory, any groups that Joe belonged to, access privileges that Joe had, or aliases that Joe used are also deleted.

The invention recognizes that deleting the references associated with the deleted entries causes several problems. As an example, an application may have to restore a deleted entry, that may have been deleted by mistake, or the user associated with the entry may have been reinstated, or for some other reason. Having deleted the references with the user's entry, the application has no way of knowing to which groups the user used to belong, or to which resources the user had access before the user's entry was deleted. The invention recognizes that change logs do not provide such information either.

As another example, the invention recognizes that deleting the references may create gaps in the knowledge gathering in the future. After a user's entry and any references there to have been deleted from a directory, an attempt to identify what type of access and to which resource the deleted user may have had will be unsuccessful.

A practical use of such information is in an audit process, such as for creating audit trails. Deleting entries with their references will cause gaps to arise in an audit report. For example, if a security breach occurs in a data processing environment, an audit may need to document which users—present and past—had access to a particular computing resource, such as a file. If the references to past users are also deleted when the past user left the organization, as is presently done, an audit process will not be able to construct a complete audit report for the past users whose entries and references have been deleted from the directory.

To address these and other problems associated with deleting entries and references in the present directories, the illustrative embodiments of the invention provide a method, computer usable program product, and data processing system for managing deleted directory entries. Using the illustrative embodiments, information about references to deleted entries can be managed, and deleted entries can be restored together with any associations, relations, or participation they may have had in other information stored in the directory. Using the illustrative embodiments, an application, system, or process can trace detailed relationships of deleted entries, such as the activities, participation, or involvement of users associated with deleted entries.

The examples in this disclosure are used only for the clarity of the description and are not limiting on the illustrative embodiments. Additional operations, actions, tasks, activities, and manipulations will be conceivable from this disclosure and the same are contemplated within the scope of the illustrative embodiments.

The illustrative embodiments are described using specific code, data structures, designs, layouts, schematics, and tools only as examples and are not limiting on the illustrative embodiments. For example, some illustrative embodiments set or reset the value of an attribute, but the illustrative embodiments may be implemented to set or reset a value of an attribute, or the value of a tag of an attribute within the scope of the illustrative embodiment.

The illustrative embodiments may be implemented with respect to any type of directory entry and any type of reference within a directory. For example, an entry may contain information about a user, system, application, component, or a combination thereof. Furthermore, the illustrative embodiments describe a user associated with an entry only for the clarity of the description, and the illustrative embodiments are equally applicable to entries associated with systems or applications.

Furthermore, the illustrative embodiments are described in some instances using particular software tools and data processing environments only as an example for the clarity of the description. The illustrative embodiments may be used in conjunction with other comparable or similarly purposed systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
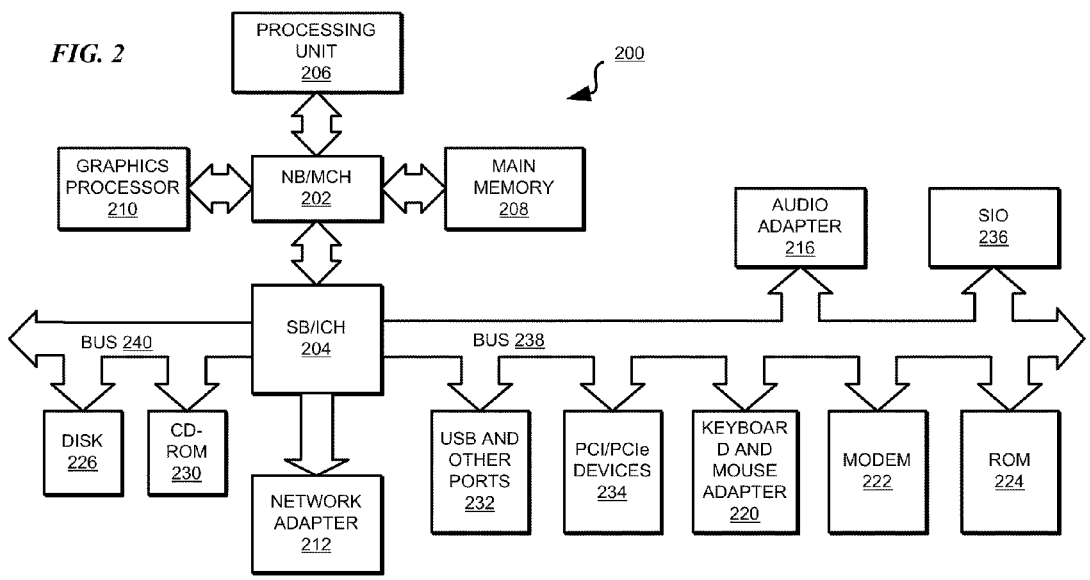
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may have software applications or software tools executing thereon. For example, server 104 may include directory server 105. Server 106 may include software tools that interact with directory server 105 or components of directory server 105, such as application 107.

Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
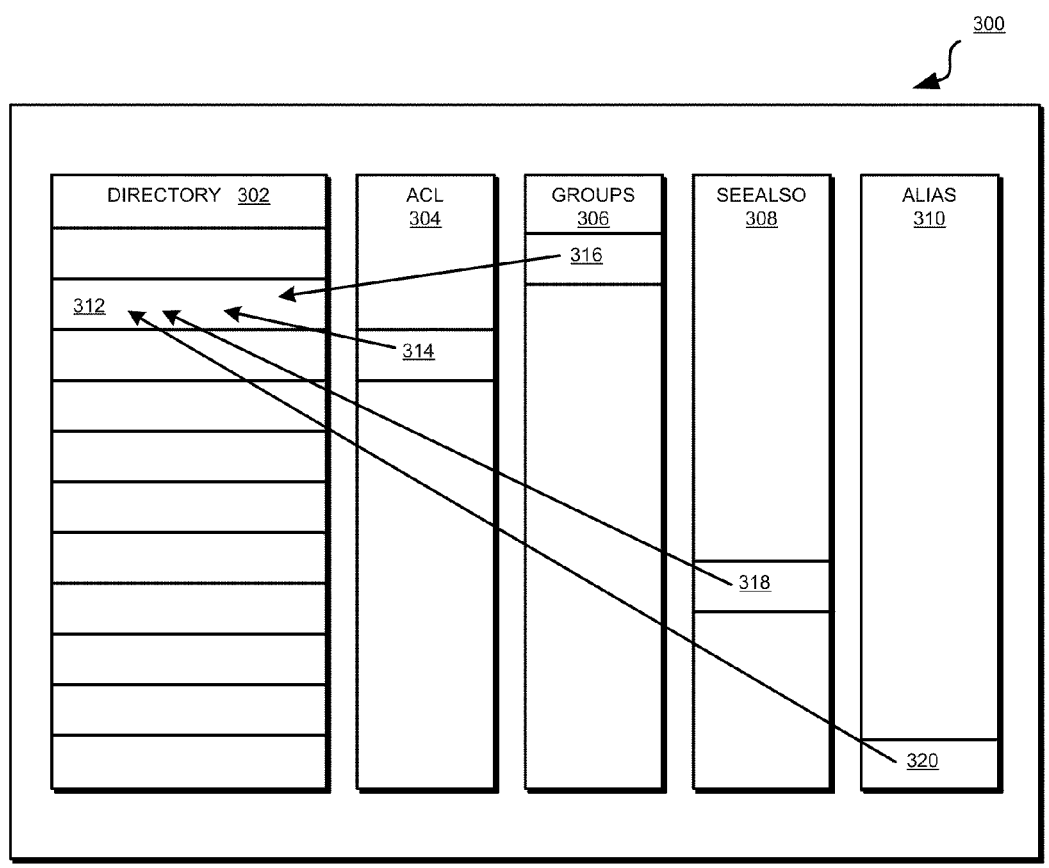
FIG. 3 depicts a block diagram of a directory in conjunction with which an illustrative embodiment may be used.

With reference to FIG. 3, this figure depicts a block diagram of a directory in conjunction with which an illustrative embodiment may be used. Directory server 300 may be implemented using directory server 105 in FIG. 1.

Directory server 300 may include directory 302. Directory server 300 may further serve or otherwise include additional data structures, for example, ACL 304, Groups list 306, See-Also list 308, and Alias list 310. Any of these and other data structures may include references to entries in one another, directory 302, or data located elsewhere in directory server 300.

For example, directory 300 may include a set of entries. Entry 312 may be an example entry in the set of entries. ACL 304 may include a reference to one or more entries in directory 302. For example, reference 314 may be a reference in ACL 304 to entry 312 in directory 302. Groups list 306 may include a reference to one or more entries in directory 302. For example, reference 316 may be a reference in groups list 306 to entry 312 in directory 302.

SeeAlso list 308 may include a reference to one or more entries in directory 302. For example, reference 318 may be a reference in seeAlso list 308 to entry 312 in directory 302. Alias list 310 may include a reference to one or more entries in directory 302. For example, reference 320 may be a reference in alias list 310 to entry 312 in directory 302.

Figure 4:
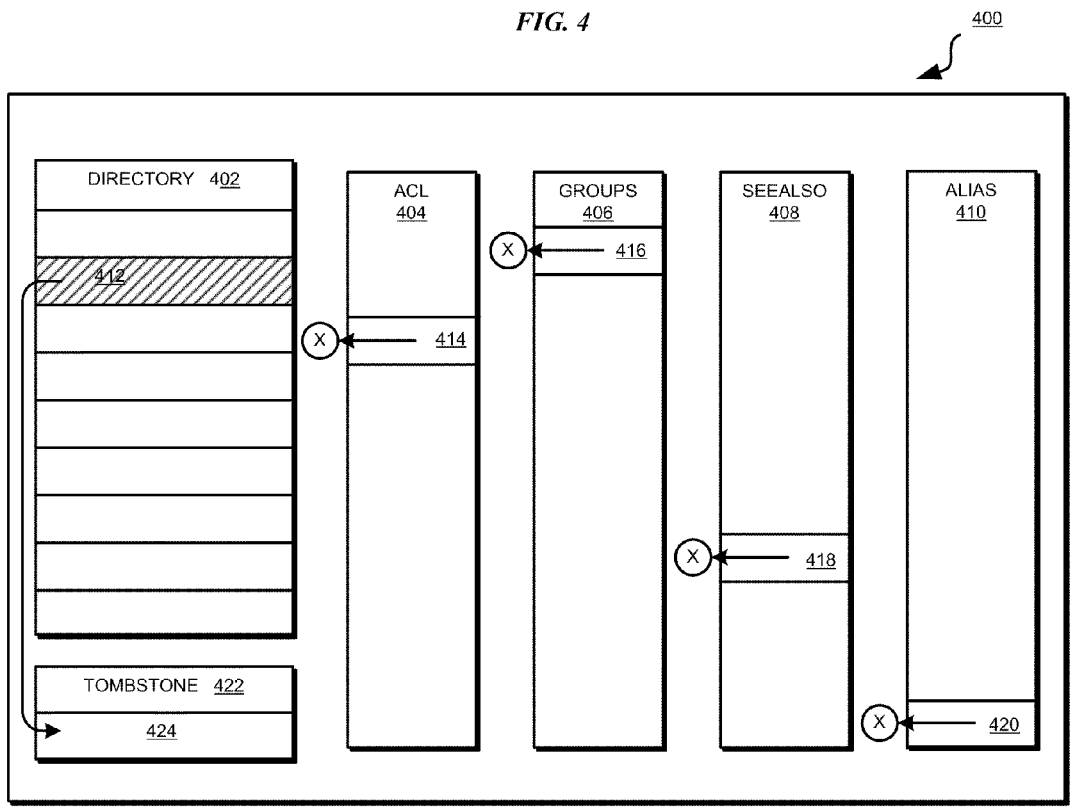
FIG. 4 depicts a block diagram of a delete operation in a directory with respect to which an illustrative embodiment may be implemented.

With reference to FIG. 4, this figure depicts a block diagram of a delete operation in a directory with respect to which an illustrative embodiment may be implemented. Directory server 400 may be similar to directory server 300 in FIG. 3.

Directory 402, ACL 404, groups list 406, seeAlso list 408, and alias list 410 may be similar to the corresponding components in FIG. 3. Entry 412 may be similar to entry 312 in FIG. 3. References 414, 416, 418, and 420 may be references to entry 412 in a manner similar to the corresponding references in FIG. 3.

Tombstone directory 422 may be a directory or another data storage in directory server 400 where deleted entries may be stored. As an example, entry 424 in tombstone directory 422 may be entry 412 when entry 412 is deleted from directory 402. Entry 424 is also called a tombstone entry. Upon such deletion of entry 412, references 414, 416, 418, and 420 are also deleted. However, presently, neither of references 414, 416, 418, or 420 is stored in tombstone directory 422 or elsewhere in directory server 400.

Presently, when an entry is deleted along with the references, the entry can be restored with the references only by one of two ways. First, an administrator has to reestablish all the references anew upon restoring the deleted entry from the tombstone directory. This process is time consuming, and in some cases may be prone to accidental omission of references that previously existed, or accidental inclusion of references that previously did not.

Second, an administrator can use an older copy of the directory, such as a directory backup file, where the entry and its references had not yet been deleted to restore the directory. However, in so restoring from an old backup, all the intermediate changes to the directory are lost.

The illustrative embodiments describe a way of including reference information in an entry in the tombstone directory. According to the illustrative embodiments, when an entry is to be deleted or otherwise made unavailable in the directory, the entry can be placed in the tombstone directory such that the tombstone entry also includes information pertaining to the various relationships, referenced, or participations the entry may have had in the directory.

Figure 5:
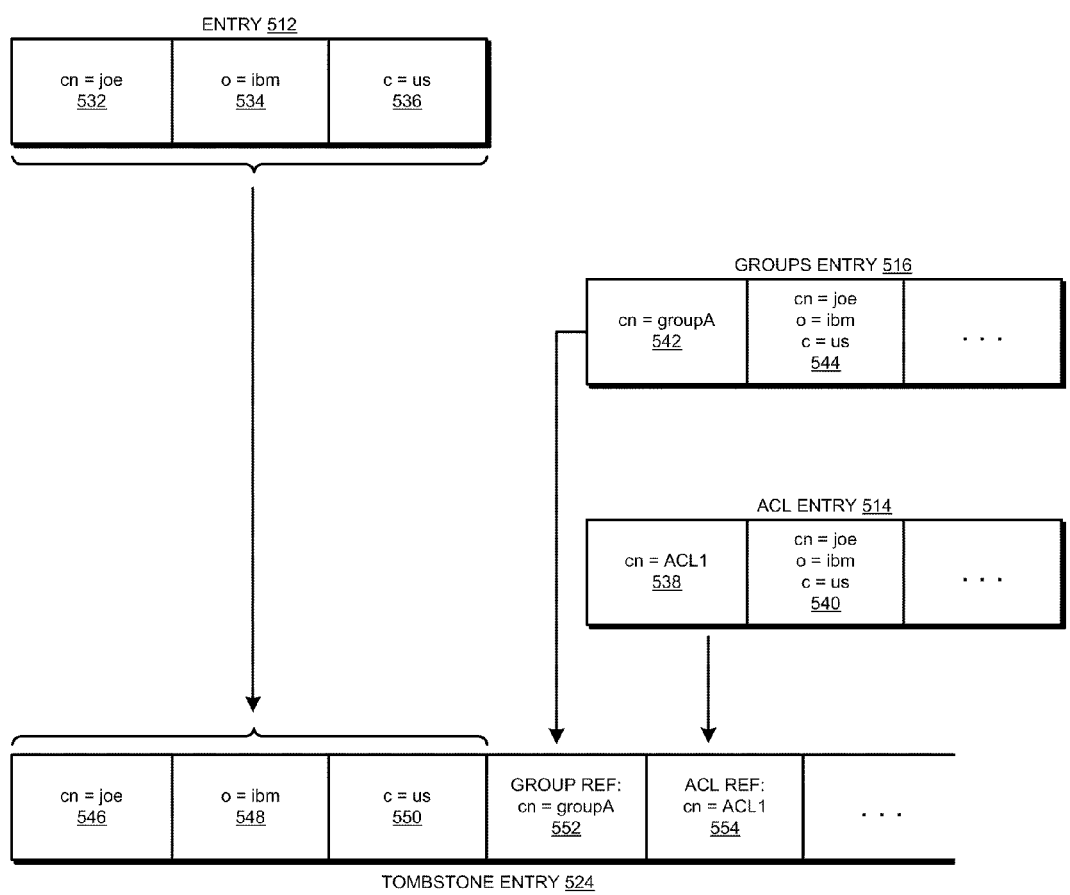
FIG. 5 depicts a block diagram of an example tombstone entry constructed in accordance with an illustrative embodiment.

With reference to FIG. 5, this figure depicts a block diagram of an example tombstone entry constructed in accordance with an illustrative embodiment. Entry 512 may be an entry in a main directory, such as entry 412 in FIG. 4. ACL entry 514 may be similar to reference 414 in FIG. 4 and Groups entry 516 may be similar to reference 416 in FIG. 4. ACL entry 514 and Groups entry 516 are only used as examples and entries 514 and 516 may each be an entry in any data structure in a directory server, such as any of references 414, 416, 418, or 420 in FIG. 4, or another entry in another reference data structure. Tombstone entry 524 may be implemented using tombstone entry 424 in FIG. 4.

In order to describe the illustrative embodiment of this figure, assume that an entry, such as entry 512, exists in a directory, such as directory 402 in FIG. 4. Assume the example entry to include several attributes including attribute 532 labeled "cn" denoting "Common Name" and have a value "Joe". Another attribute of the example entry, attribute 534, may be labeled "o" denoting "Organization" and have a value "IBM". Another attribute of the example entry, attribute 536, may be labeled "c" denoting "Country" and have a value "US". The example entry may include any number of additional attributes (not shown). Collectively, the "cn", "o", "c", and other similar attributes make up a "distinguished name" of an entry, in this case a distinguished name of entry 512. An entry can be uniquely identified using the entry's distinguished name.

Further assume that an entry referring to the example entry, such as ACL entry 514, exists in another data structure, such as access control list 404 in FIG. 4. Such a reference entry may have its own distinguished name, which may be constructed as suitable for a particular implementation. As an example, ACL entry 514 may include attribute 538 as all or part of ACL entry 514's distinguished name. Attribute 538 may be labeled "cn" and having a value "ACL1". ACL entry 514 may also include the "cn", "o", and "c" attributes and their values corresponding to the actual entry, entry 512 in the depicted example, to which ACL entry 514 refers.

In one embodiment, distinguished name attributes, such as "cn", "o", "c", or other similar attributes, of a referenced entry may not be separate attributes in a reference entry, but may be tags with respective values in an attribute without departing from the scope of the illustrative embodiments. As an example, attribute 540 of ACL entry 514 may include tags "cn", "o", and "c" with respective values corresponding to attributes 532, 534, and 536 respectively of entry 512.

Similarly, another entry referring to the example entry, such as Groups entry 516, may exist in another data structure, such as groups list 406 in FIG. 4. Such a reference entry may have its own distinguished name, which may also be constructed as suitable for a particular implementation. As an example, Groups entry 516 may include attribute 542 as all or part of Groups entry 516's distinguished name. Attribute 542 may be labeled "cn" and having a value "groupA". Groups entry 516 may also include attribute 544, which may include the "cn", "O", and "c" tags and their values corresponding to the distinguished name of the actual entry, entry 512 in the depicted example, to which Groups entry 516 refers.

Tombstone entry 524 in this figure is modified from the presently used tombstone entries according to an illustrative embodiment. Tombstone entry 524 preserves the reference to the actual entry in the reference entry when the actual entry is deleted or otherwise made unavailable in the directory.

As an example, tombstone entry 524 is depicted to include attributes 546, 548, and 550, which correspond to attributes 532, 534, and 536 respectively of entry 512 being deleted or being made unavailable. Of course, tombstone in a given implementation, tombstone entry 524 could copy, move, store, or otherwise preserve any number of attributes from entry 512.

Tombstone entry 524 according to an illustrative embodiment further includes information about a reference to entry 512. In the depicted example, tombstone entry 524 is shown to include attribute 552 that corresponds to attribute 542 of Groups entry 516. Similarly, tombstone entry 524 is shown to include attribute 554 that corresponds to attribute 538 of ACL entry 514. Attributes 552 and 554 are each called a reference attribute. The information a reference attribute stores is called reference information.

Constructed in this or a similar manner, tombstone entry 524 preserves not only the information about the entry to be deleted but also the information about the references that reference that entry. In the depicted example, tombstone entry 524 preserves the attributes of entry 512 as well as the distinguished names of reference entries 514 and 516 that reference entry 512.

In one embodiment, tombstone entry 524 can include all or a subset of the attributes, tags, or a combination thereof, from reference entries that reference the main entry. In another embodiment, tombstone entry 524 can include the attributes, tags, or a combination thereof, that form the distinguished name of the reference entries that reference the main entry. In another embodiment, tombstone entry 524 may include an attribute for a reference entry and several tags within that attribute may identify the reference entry, such as by the distinguished name of the reference entry. In another embodiment, tombstone entry 524 may include different subsets of attributes, tags, or a combination thereof, for different reference entries according to specific implementation within the scope of the invention.

With reference to FIG. 6, this figure depicts a flowchart of a process of preserving references to a deleted directory entry in accordance with an illustrative embodiment. Process 600 may be implemented in a directory server, such as directory server 105 in FIG. 1. Process 600 may also be implemented in a software application that may interact with a directory server, for example, in application 107 in FIG. 1.

Process 600 begins by receiving an instruction to delete an entry in a directory (step 602). Process 600 identifies a reference to the deleted or about to be deleted entry (step 604).

Process 600 adds, moves, copies, or otherwise preserves the entry to be deleted to a deleted entries subtree, such as a tombstone directory (step 606). Process 600 adds one or more attributes, tags, or a combination thereof, to the entry in the deleted entries subtree to store information about the reference (step 608).

Process 600 deletes or otherwise makes unavailable the entry in the directory (step 610). Process 600 ends thereafter.

With reference to FIG. 7, this figure depicts a flowchart of a process of restoring a previously deleted entry that has been preserved according to an illustrative embodiment. Process 700 may be implemented in a directory server, such as directory server 105 in FIG. 1. Process 700 may also be implemented in a software application that may interact with a directory server, for example, in application 107 in FIG. 1.

Process 700 begins by receiving an instruction to restore a previously deleted or unavailable entry in a directory (step 702). Process 700 locates the entry in a deleted entries subtree, such as a tombstone directory (step 704). Process 700 restores the entry's attributes, tags, or a combination thereof, to the directory from the deleted entries subtree (step 706).

Process 700 determines reference information about the entry from a reference attribute in the entry in the deleted entries subtree (step 708). Using the reference information determined from the reference attributes in step 708, process 700 restores one or more references to the restored entry (step 710). As an example, using the reference information, process 700 may add a new reference entry to a reference data structure, modify an existing entry in a reference data structure, or otherwise manipulate a data structure that references entries, to restore or recreate a reference to the restored entry of step 706.

Process 700 deletes or otherwise makes unavailable the entry in the deleted entries subtree (step 712). Process 700 ends thereafter.

With reference to FIG. 8, this figure depicts a flowchart of a process of supporting an application or business process by managing deleted entries in accordance with an illustrative embodiment. Process 800 may be implemented in a directory server, such as directory server 105 in FIG. 1. Process 800 may also be implemented in a software application that may interact with a directory server, for example, in application 107 in FIG. 1.

As an example described earlier in this disclosure, an audit process or an auditing application is used to illustrate process 800. As described before, present techniques of deleting and restoring entries in a directory may leave gaps in the operation of such applications and processes. For example, without an embodiment of the invention, an audit report generated by an audit application may contain gaps where the audit depends on relationships and references a directory entry had before the entry was deleted. The illustrative embodiments, including process 800, may benefit audit applications, audit process, and other applications and processes that use historical reference information.

Process 800 begins by receiving a request from a process, such as an audit process, that needs information about a deleted entry (step 802). Process 800 restores the deleted entry attributes to the directory (step 804). In one embodiment, step 804 may be performed by parts of process 700 in FIG. 7. In another embodiment, step 804 may be omitted if an entry has already been restored, such as for another purpose.

Process 800 determines whether any references to the deleted entry should also be restored for the requesting process (step 806). In one embodiment, process 800 may simply detect a reference attribute in a deleted entry in a deleted entries subtree to answer the question in step 806. In another embodiment, process 800 may detect the presence of a reference attribute, and execute a rule or logic computation to determine whether the reference based on the reference information of the reference attribute should be restored for the requesting process.

If process 800 determines that a reference should be restored ("YES" path of step 806), process 800 restores a reference to the restored entry using the information in a reference attribute of the deleted entry (step 808). Process 800 proceeds to step 810 thereafter. If process 800 determines that a reference does not have to be restored ("NO" path of step 806), process 800 proceeds to step 810 as well.

Process 800 provides the information about the restored entry and any restored references to the requesting process of step 802 (step 810). Process 800 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for managing deleted directory entries. By implementing an embodiment of the invention, an entry may be deleted or otherwise made unavailable from a directory in a way that any references to the entry being deleted are preserved along with the information contained in the entry. The information about the entry and all or some of the relationships, references, or participations of the entries can be restored to a state prior to the deletion of the entry by using an embodiment of the invention.

The restoration process according to an embodiment of the invention reduces or eliminates the presently used manual reconstruction of a restored entry's relationships and references. In so doing, the illustrative embodiments of the invention reduce or eliminate errors and costs associated with the presently used manual processes. The illustrative embodiments further provide information to other processes, such as the audit process described as an example above, where otherwise those processes would encounter gaps in information.

An embodiment of the invention can be implemented in any directory environment. For example, a directory configuration may include a production environment—a directory in actual use for its intended purpose, and a test environment—a directory to test changes for errors or unintended effects of the changes. The test environment may be as elaborate as a full replica of the production environment, an isolated replica directory server, as simple as a stand-alone directory server, or any combination thereof.

An embodiment of the invention may be used to restore deleted entries in a test environment. In some cases, restoring deleted entries according to the invention in a test environment may be adequate for addressing the needs of a process that wishes to use the deleted entries, such as an auditing process or a reporting process. In other cases, restoring the deleted entries in the test environment before restoring in the production environment may offer reduced exposure of production data. The various embodiments of the invention may be implemented in any combination of data processing environments involving any type of directory or database within the scope of the invention.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for preserving a reference to an entry in a directory stored in a computer memory, the computer implemented method comprising:

receiving an instruction to delete a first entry in a directory stored in a computer memory of a directory server;

identifying a second entry that includes a reference to the first entry, the reference to the first entry being a reference information;

adding a third entry in a deleted entries subtree, the third entry including information to be preserved from the first entry;

modifying the third entry to include the reference information from the second entry; and saving the third entry such that during a restore of the first entry the third entry provides (i) the information preserved from the first entry to restore the first entry and (ii) the reference information in the second entry to restore the reference to the first entry.

2. The computer implemented method of claim 1, wherein the reference information is a combination of an identifier of the second entry and an identifier of the first entry.

3. The computer implemented method of claim 1, wherein the modifying the third entry to include the reference information comprises:
adding a set of attributes to the third entry, the set of attributes storing an identifier of the second entry.

4. The computer implemented method of claim 1, further comprising:
restoring the first entry to form a restored entry, wherein the restoring comprises:
making the restored entry available in the directory, the restored entry including the information preserved from the first entry in the third entry;
identifying the second entry using the reference information in the third entry; and
recreating a reference in the second entry to the restored entry based on the reference information in the third entry, forming a restored second entry.

5. The computer implemented method of claim 4, further comprising:
receiving a request for information about the first entry from an application;
providing to the application, first information from the restored entry; and
providing to the application, second information based on the reference in the restored second entry to the restored entry.

6. The computer implemented method of claim 5, wherein the application is an audit application.

7. The computer implemented method of claim 4, wherein the second entry and the restored second entry are each an entry in one of (i) an access control list in the directory, (ii) a groups list in the directory, (iii) seeAlso list in the directory, and (iv) an alias list in the directory.

8. The computer implemented method of claim 4, wherein the restoring is performed in a second directory, wherein the second directory includes a copy of a portion of data of the directory.

9. A computer usable program product comprising a computer usable storage medium including computer usable code for preserving a reference to an entry in a directory stored in a computer memory, the computer usable code comprising:
computer usable code for receiving an instruction to delete a first entry in a directory stored in a computer memory of a directory server;
computer usable code for identifying a second entry that includes a reference to the first entry, the reference to the first entry being a reference information;
computer usable code for adding a third entry in a deleted entries subtree, the third entry including information to be preserved from the first entry;
computer usable code for modifying the third entry to include the reference information from the second entry; and
computer usable code for saving the third entry such that during a restore of the first entry the third entry provides (i) the information preserved from the first entry to restore the first entry and (ii) the reference information in the second entry to restore the reference to the first entry.

10. The computer usable program product of claim 9, wherein the computer usable code for modifying the third entry to include the reference information comprises:
computer usable code for adding a set of attributes to the third entry, the set of attributes storing an identifier of the second entry.

11. The computer usable program product of claim 9, further comprising:
computer usable code for restoring the first entry to form a restored entry, wherein the computer usable code for restoring comprises:
computer usable code for making the restored entry available in the directory, the restored entry including the information preserved from the first entry in the third entry;
computer usable code for identifying the second entry using the reference information in the third entry; and
computer usable code for recreating a reference in the second entry to the restored entry based on the reference information in the third entry, forming a restored second entry.

12. The computer usable program product of claim 11, further comprising:
computer usable code for receiving a request for information about the first entry from an application;
computer usable code for providing to the application, first information from the restored entry; and
computer usable code for providing to the application, second information based on the reference in the restored second entry to the restored entry.

13. The computer usable program product of claim 11, wherein the second entry and the restored second entry are each an entry in one of (i) an access control list in the directory, (ii) a groups list in the directory, (iii) seeAlso list in the directory, and (iv) an alias list in the directory.

14. The computer program product of claim 9, wherein the computer usable code is stored in a computer readable storage medium in a data processing system, and wherein the computer usable code is transferred over a network from a remote data processing system.

15. The computer program product of claim 9, wherein the computer usable code is stored in a computer readable storage medium in a server data processing system, and wherein the computer usable code is downloaded over a network to a remote data processing system for use in a computer readable storage medium associated with the remote data processing system.

16. A data processing system for preserving a reference to an entry in a directory, the data processing system comprising:
a storage device including a storage medium, wherein the storage device stores computer usable program code; and
a processor, wherein the processor executes the computer usable program code, and wherein the computer usable program code comprises:
computer usable code for receiving an instruction to delete a first entry in a directory stored in a computer memory of a computer;
computer usable code for identifying a second entry that includes a reference to the first entry, the reference to the first entry being a reference information;
computer usable code for adding a third entry in a deleted entries subtree, the third entry including information to be preserved from the first entry;

computer usable code for modifying the third entry to include the reference information from the second entry; and computer usable code for saving the third entry such that during a restore of the first entry the third entry provides (i) the information preserved from the first entry to restore the first entry and (ii) the reference information in the second entry to restore the reference to the first entry.

17. The data processing system of claim 16, wherein the computer usable code for modifying the third entry to include the reference information comprises:

computer usable code for adding a set of attributes to the third entry, the set of attributes storing an identifier of the second entry.

18. The data processing system of claim 16, further comprising:

computer usable code for restoring the first entry to form a restored entry, wherein the computer usable code for restoring comprises:

computer usable code for making the restored entry available in the directory, the restored entry including the information preserved from the first entry in the third entry;

computer usable code for identifying the second entry using the reference information in the third entry; and computer usable code for recreating a reference in the second entry to the restored entry based on the reference information in the third entry, forming a restored second entry.

19. The data processing system of claim 18, further comprising:

computer usable code for receiving a request for information about the first entry from an application;

computer usable code for providing to the application, first information from the restored entry; and computer usable code for providing to the application, second information based on the reference in the restored second entry to the restored entry.

20. The data processing system of claim 18, wherein the second entry and the restored second entry are each an entry in one of (i) an access control list in the directory, (ii) a groups list in the directory, (iii) seeAlso list in the directory, and (iv) an alias list in the directory.

* * * * *